(12) United States Patent
Caccami et al.

(10) Patent No.: US 12,227,037 B2
(45) Date of Patent: Feb. 18, 2025

(54) RFID SENSOR DEVICE WITH PATCH-TYPE ANTENNA FOR TIRES

(71) Applicant: Bridgestone Europe NV/SA [BE/BE], Zaventem (BE)

(72) Inventors: Maria Cristina Caccami, Rome (IT); Gaetano Marrocco, Rome (IT); Cecilia Occhiuzzi, Rome (IT); Sara Amendola, Rome (IT); Nicola D'Uva, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 297 days.

(21) Appl. No.: 17/926,656

(22) PCT Filed: May 24, 2021

(86) PCT No.: PCT/EP2021/063740
§ 371 (c)(1),
(2) Date: Nov. 21, 2022

(87) PCT Pub. No.: WO2021/239645
PCT Pub. Date: Dec. 2, 2021

(65) Prior Publication Data
US 2023/0144232 A1   May 11, 2023

(30) Foreign Application Priority Data
May 27, 2020   (IT) .................. 102020000012595

(51) Int. Cl.
*B60C 23/04* (2006.01)
*G06K 19/077* (2006.01)
(Continued)

(52) U.S. Cl.
CPC ...... *B60C 23/0452* (2013.01); *B60C 23/0493* (2013.01); *G06K 19/07764* (2013.01);
(Continued)

(58) Field of Classification Search
CPC ............ B60C 23/0452; B60C 23/0493; G06K 19/07764; H01Q 1/2241; H01Q 1/48; H01Q 9/0421; H01Q 9/0457
(Continued)

(56) References Cited

U.S. PATENT DOCUMENTS 10,082,381 B2 * 9/2018 McMillen ................ G01B 7/06
2004/0252072 A1 * 12/2004 Adamson ............ B60C 23/0493
343/873

(Continued)

FOREIGN PATENT DOCUMENTS

DE   102004046193 A1   4/2006
EP     389406 B1        8/1994
(Continued)

OTHER PUBLICATIONS

International Searching Authority: European Patent Office Search Report in corresponding International Application No. PCT/EP2021/063740 dated Aug. 7, 2021, 3 pages.

*Primary Examiner* — Naomi J Small
(74) *Attorney, Agent, or Firm* — Patterson Intellectual Property Law, PC

(57) ABSTRACT

The invention concerns an RFID sensor device (1, 2, 3) for tires, designed to be embedded/integrated, at least partially, in/into, or applied to, a tire (4) and comprising a patch-type antenna that includes a multilayer structure comprising: a bottom ground plane (10, 20, 30); an intermediate dielectric substrate (11, 21, 31) arranged on the bottom ground plane (10, 20, 30); and one or more top conductive patches (12, 13, 22, 32) arranged on the intermediate dielectric substrate (11, 21, 31) and covering partially or completely said intermediate dielectric substrate (11, 21, 31), wherein said bottom ground plane (10, 20, 30) and said one or more top conductive patches (12, 13, 22, 32) are short-circuited or capacitively coupled. The RFID sensor device (1, 2, 3) further (Continued)

comprises: a rigid or flexible board (15, 25, 33) arranged on said one or more top conductive patches (12, 13, 22, 32) and/or the intermediate dielectric substrate (11, 21, 31); an RFID chip (16, 26, 34) installed on the rigid/flexible board (15, 25, 33) and connected/coupled to said one or more top conductive patches (12, 13, 22, 32); a temperature sensor integrated into, or connected to, said RFID chip (16, 26, 34); and a pressure sensor (17, 27, 35) installed on the rigid/flexible board (15, 25, 33) and connected to the RFID chip (16, 26, 34). The bottom ground plane (10, 20, 30) is formed: by conductive textile/fabric/thread/fiber/yarn elements/layers or by a metal weft/net/mesh; or at least partially by conductive and/or metal elements/layers of the tire (4). The intermediate dielectric substrate (11, 21, 31) is made at least partially of rubber, or is formed at least partially by dielectric and/or rubber elements/layers of the tire (4).

20 Claims, 8 Drawing Sheets

(51) Int. Cl.
*H01Q 1/22* (2006.01)
*H01Q 1/48* (2006.01)
*H01Q 9/04* (2006.01)

(52) U.S. Cl.
CPC ......... *H01Q 1/2225* (2013.01); *H01Q 1/2241* (2013.01); *H01Q 1/48* (2013.01); *H01Q 9/0421* (2013.01); *H01Q 9/0457* (2013.01)

(58) Field of Classification Search
USPC .......................................................... 340/447
See application file for complete search history.

(56) References Cited

U.S. PATENT DOCUMENTS

| | | | |
|---|---|---|---|
| 2007/0109112 A1* | 5/2007 | Lee | H01Q 7/06 340/447 |
| 2008/0289736 A1 | 11/2008 | Adamson et al. | |
| 2015/0097662 A1 | 4/2015 | Yu et al. | |
| 2015/0222204 A1* | 8/2015 | Abou-Nasr | B60C 23/0493 310/309 |
| 2017/0277992 A1 | 9/2017 | Janko et al. | |
| 2018/0009261 A1* | 1/2018 | Balnis | B60C 1/00 |

FOREIGN PATENT DOCUMENTS

| | | |
|---|---|---|
| EP | 2278533 A1 | 1/2011 |
| KR | 100822850 B1 | 4/2008 |
| WO | 2020170057 A1 | 8/2020 |

\* cited by examiner

RFID SENSOR DEVICE WITH PATCH-TYPE ANTENNA FOR TIRES

TECHNICAL FIELD OF THE INVENTION

The present invention relates to an improved radiofrequency identification (RFID) device with patch-type antenna for tires, which is equipped with sensors for monitoring tire physical conditions (such as temperature, pressure, etc.).

STATE OF THE ART

As is known, tire manufacturing is a complex process, wherein the quality of the final products (i.e., the tires) depends on the exact combination of temperatures, pressures and timing applied during manufacturing to provide the tire elastomeric compound with outstanding mechanical properties.

In particular, performance and lifetime of a tire depend, among other things, on environmental conditions (such as temperature, pressure, etc.) which the tire is subject to during manufacturing and in use.

In automotive sector and, in particular, in tire sector, it is, thence, felt the need to monitor physical conditions of tires (such as temperature, pressure, etc.) during manufacturing and in use.

Nowadays, several technical solutions are known to perform this monitoring task, such as those based on radiofrequency identification (RFID) technology.

For example, Italian patent application No. 102016000009727 discloses a configurable and tunable radiofrequency wireless sensor device that may be advantageously integrated/incorporated into, or applied to, a tire to enable identification of the tire during its manufacturing and use, and that is designed to provide also diagnostic data, such as temperature or pressure data.

In this connection, it is worth noting that embedding an RFID tag in a tire (that is an elastic and highly flexible body) may cause damages to the tire or to cords thereof (e.g., it may cause tire layer separation/delamination, cord/body ply breakage, etc.) during manufacturing of the tire (e.g., during tire vulcanization/curing) and also during its normal operation, with consequent safety risks.

In other words, an RFID transponder for use in tires should be designed to be as flexible and miniaturized as possible in order to match tire properties and to provide acceptable remote reading distances (e.g., 30 cm).

An improved RFID device for tires with enhanced performance and such that to avoid causing damages to tires (or to cords thereof) is disclosed in Applicant's international application WO 2020/170057 A1, which relates to an RFID device for tires, designed to be applied to an inner liner of a tire before or after tire vulcanization/curing and comprising a flexible multilayer planar structure including:
- a substrate;
- a first insulating layer covering a first portion of the substrate, thereby leaving exposed a second portion thereof extending around said first portion;
- an RFID chip and a first antenna that are connected to each other and arranged on the first insulating layer;
- a second antenna that is electromagnetically coupled with the first antenna and that extends, at least partially, on the first insulating layer; wherein the RFID chip, the first antenna and the second antenna lie on one and the same plane; and
- a second insulating layer covering the first insulating layer, the RFID chip, the first antenna and, at least partially, the second antenna.

In particular, said first antenna is conveniently designed to operate as a near-field coupler (for example, a two-dimensional (2D) folded structure having a loop-like or circular or rectangular or square or meander-line-like or spiral-like shape can be advantageously used), and said second antenna is conveniently designed to operate as a far-field radiating antenna.

More specifically, said second antenna is preferably a parasitic radiator that can be conveniently formed by:
- a meander-line-shaped conductive wire, or
- a straight conductive wire, or
- an assembly of twisted conductive wires, or
- an assembly of twisted conductive and non-conductive wires.

According to WO 2020/170057 A1, a temperature sensor can be advantageously integrated into the RFID chip to measure temperature values, wherein the RFID chip is configured to provide an interrogating RFID reader, in addition to an univocal identifier of the tire, also with the temperature values measured by the temperature sensor.

Further examples of RFID tags embedded in tires for (mainly or only) logistic/tracking/identification purposes and equipped with dipole or spring antennas are disclosed in US 2017/0277992 A1, US 2008/0289736 A1 and EP 0 389 406 B1, whereas KR 10-0822850 B1, which relates to a flexible and conductive RFID tag for tires, deals with durability of RFID tags embedded/integrated in tires.

Additionally, DE 10 2004 046193 A1 discloses a tire pressure sensor that has a sensor device and an antenna device, in particular a patch-type antenna, more specifically a Planar Inverted-F Antenna (PIFA), for radiation and receiving of electromagnetic fields. The sensor device is actively designed as partially electromagnetic and is electromagnetically and operatively connected with the antenna device for radiation and receiving of electromagnetic fields. The sensor device is partially operated as a part of electromagnetic resonators.

Moreover, US 2015/097662 A1 discloses a flexible board type tire pressure sensor device that includes: a flexible Printed Circuit (PC) board having a first surface bonded to an inside wall of a tire of a vehicle wheel and a second surface opposite to the first surface; a sensor module installed in the second surface of the flexible PC board for sensing a variety of statuses of the vehicle wheel; a transmission terminal set installed in the second surface of the flexible PC board and electrically connected with the sensor module for allowing transmission of a communication program to the sensor module; and an antenna installed in the second surface of the flexible PC board and electrically connected with the sensor module for sending out a sensor signal generated by the sensor module.

Finally, EP 2 278 533 A1 discloses an RFID tag that comprises: a substrate; a semiconductor package mounted on the substrate, the semiconductor package including a semiconductor chip encapsulated therein and a plurality of connection terminals thereon, the plurality of connection terminals including signal terminals and dummy terminals; and an antenna pattern formed on the substrate and electrically connected to the signal terminals; wherein the antenna pattern is extended so as to overlap with at least a part of a bottom region of the semiconductor package.

OBJECT AND SUMMARY OF THE INVENTION

In view of the foregoing, the Applicant has felt the need to carry out an in-depth study in order to develop an improved RFID sensor device for tires, thereby conceiving the present invention.

Thence, object of the prevent invention is that of providing an RFID sensor device for tires with enhanced performance and/or features with respect to those of currently known solutions.

This and other objects are achieved by the present invention in that it relates to a radiofrequency identification (RFID) sensor device for tires, as defined in the appended claims.

In particular, the RFID sensor device according to the present invention is designed to be embedded/integrated, at least partially, in/into, or applied to, a tire and comprises a patch-type antenna that includes a multilayer structure comprising:
- a bottom ground plane;
- an intermediate dielectric substrate arranged on the bottom ground plane; and
- one or more top conductive patches arranged on the intermediate dielectric substrate and covering partially or completely said intermediate dielectric substrate, wherein said bottom ground plane and said one or more top conductive patches are short-circuited or capacitively coupled.

Moreover, said RFID sensor device further comprises:
- a rigid or flexible board arranged on said one or more top conductive patches and/or the intermediate dielectric substrate;
- an RFID chip installed on the rigid/flexible board and connected/coupled to said one or more top conductive patches;
- a temperature sensor integrated into, or connected to, said RFID chip; and
- a pressure sensor installed on the rigid/flexible board and connected to the RFID chip.

The bottom ground plane is formed:
- by conductive textile/fabric/thread/fiber/yarn elements/layers or by a metal weft/net/mesh; or
- at least partially by conductive and/or metal elements/layers of the tire.

The intermediate dielectric substrate is made at least partially of rubber, or is formed at least partially by dielectric and/or rubber elements/layers of the tire.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

Figure 1:
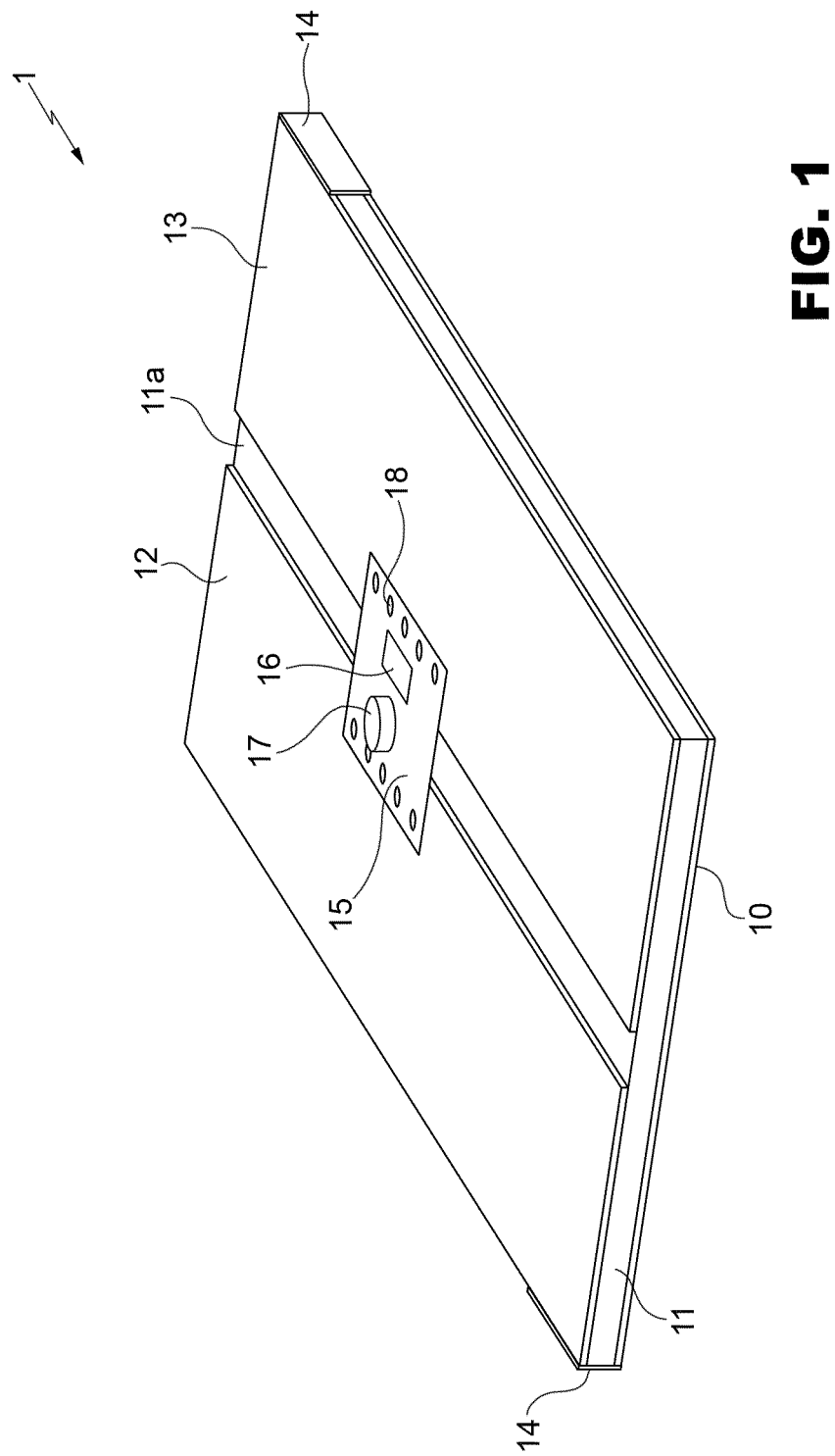
FIG. 1 schematically illustrates a first RFID sensor device according to a first preferred embodiment of the present invention.

The following discussion is presented to enable a person skilled in the art to make and use the invention. Various modifications to the embodiments shown and described will be readily apparent to those skilled in the art, without departing from the scope of the present invention as claimed. Thence, the present invention is not intended to be limited to the embodiments shown and described, but is to be accorded the widest scope of protection consistent with the principles and features disclosed herein and defined in the appended claims.

The present invention concerns an RFID sensor device with capability to provide, in addition to tire identification, also additional information items related to physical and/or environmental conditions (such as temperature, pressure, deformation, strain, acceleration, stress, etc.) which a tire is subject to during manufacturing and in use. Said RFID sensor device is preferably of the passive type (i.e., operating without battery). In this respect, it is worth recalling that, as is known, a passive RFID device does not need any dedicated power supply, since it is typically designed to extract power from radiofrequency (RF) energy wirelessly transmitted by an interrogating RFID reader. However, it is worth noting that the RFID sensor device according to the present invention may conveniently be also of the semi-active type (i.e., provided with its own power source, such as a battery, used to energize RFID sensor device's chip and sensors, whereas reading operation is performed based on RF energy emitted from an interrogating RFID reader, like passive RFID tags).

More specifically, the present invention concerns an RFID sensor device capable of providing, in addition to tire identification (e.g., for logistic/tracking purposes), also physical and/or environmental parameters (e.g., temperature, pressure, etc.) sensed by means of two or more ad hoc sensors.

The RFID sensor device according to the present invention can be advantageously exploited, for example, for real-time monitoring of temperature and/or inflation pressure of tires to determine tires' status under operating conditions (i.e., for tire health real-time monitoring) and/or to enable replacement of current fill valves equipped with pressure sensors of standard tire-pressure monitoring systems (TPMSs).

Additionally, the RFID sensor device according to the present invention can be advantageously exploited for:
- quality assessment and improvement during tire production;
- optimal performance evaluation during tire use in racing contexts;
- assessment of satisfactory performance during tire use in avionic contexts;

real-time monitoring of tires during their use by means of onboard RFID readers and/or by means of external RFID readers installed at specific gates crossed by vehicles/trucks/buses.

Proper design of said RFID sensor device has been an extremely challenging duty due to the contemporary need for power consumption minimization, multiple physical parameter monitoring capability and operation in an electromagnetically harsh environment (with presence of materials with high loss/metals), as well as integration in tires without causing any mechanical damage or performance reduction thereto.

Preferably, said RFID sensor device (which is conveniently designed to operate in ultra-high frequency (UHF) RFID bands (860-960 MHz)) is flexible so as to match tires' mechanical properties.

More specifically, said RFID sensor device comprises a radiating element (i.e., an antenna), an RFID chip and two or more sensors for monitoring physical and/or environmental parameters, which sensors can be conveniently integrated into the RFID chip, or can be conveniently arranged externally to, and connected to, said RFID chip.

The antenna (which can be conveniently connected to RF pads of the RFID chip) is an antenna of the patch-type (also known as microstrip antenna, antenna with lower metallization or ground plane, grounded antenna or multilayered antenna), differently from known solutions that are typically based on single-layer dipole-like antennas (e.g., T-matched and/or inductively coupled—for example, made of conductive yarn or enameled wire(s)), such as those described in the Italian patent application 102016000009727 and in WO 2020/170057 A1.

In this respect, it is worth noting that, while single-layer dipole-like antennas have the main benefit of a thin and elongated footprint with minimal disturbance to tires during integration, a patch-type antenna is, instead, able to withstand contact with the high-loss/metal parts of tires (such as those present in tires' tread) and is affected by smaller mechanical deformations.

More in detail, the RFID sensor device according to the present invention comprises a patch-type antenna that includes a multilayer structure comprising at least three stacked layers, namely from the bottom upwards:
  a bottom ground plane that is formed by
    conductive textile/fabric/thread/fiber/yarn elements/layers or by a metal weft/net/mesh, or
    at least partially by conductive and/or metal elements/layers of the tire;
  an intermediate dielectric substrate (which may conveniently include a plurality of layers) that is made at least partially of rubber, or is formed at least partially by dielectric and/or rubber elements/layers of the tire; and
  one or more top conductive patches (which can be conveniently made of one or more electrically conductive materials, such as one or more metals, which can be conveniently shaped in an arbitrary way, and which may conveniently include several slots), wherein the bottom ground plane and said top conductive patch(es) are short-circuited or capacitively coupled.

Said multilayer structure (with its peculiar antenna layout just described) has been specifically conceived by the Applicant so as to achieve an integrated RFID sensor device operable within/in synergy with a tire.

In particular, the bottom ground plane and the intermediate dielectric substrate (with their respective peculiar features just described) allow provide the multilayer structure with electric, electromagnetic and mechanical properties such as to enable integration of the RFID sensor device into a tire while assuring a proper functioning thereof.

As previously explained, the bottom ground plane can be conveniently made by exploiting some structural elements of tires (e.g., electrically conductive components already present in tires, for example in tread ply), or can be conveniently made by means of conductive textile/fabric/thread/fiber/yarn elements or a metal weft/net/mesh, whose spacing is properly sized so as to electromagnetically result as an equivalent continuous electrically-conductive plane at the operating frequency/ies of the RFID sensor device.

The intermediate dielectric substrate can be conveniently made by means of one or more flexible (e.g., felt) and/or rigid layers. In particular, said intermediate dielectric substrate may conveniently include (or be made up of) a portion of tire rubber. In this case, it is preferably used a gridded/meshed bottom ground plane that allows the natural rubber to permeate through the holes of said gridded/meshed bottom ground plane and to seal with the rubber used as intermediate dielectric substrate.

The patch-type antenna is shielded from lower metals/high-loss materials of a tire and is designed to focus radiated electromagnetic field up and, in consequence, provides improved radiofrequency (RF) performance thanks to the reduction of the influence of the materials (metals/high-loss materials) below said patch-type antenna and to the improvement of the electromagnetic radiation in the direction above said patch-type antenna (i.e., in the broadside direction). Therefore, the RFID sensor device according to the present invention can be advantageously integrated also in areas of a tire that include strongly RFID-unfriendly materials and that are more subject to wear and deterioration (e.g., tire tread and tire area close to bead bundles).

The RFID sensor device according to the present invention includes at least a temperature sensor integrated into the RFID chip and a pressure sensor external to the RFID chip and connected thereto (for inflation pressure monitoring). The RFID sensor device may conveniently include also one or more additional sensors external to the RFID chip and connected thereto (e.g., a deformation sensor, a strain sensor, an acceleration sensor, a stress sensor, an additional temperature sensor, etc.). In particular, the RFID sensor device preferably includes also an additional temperature sensor external to the RFID chip and connected thereto, so as to monitor the temperature in two points of a tire (e.g., the temperatures of the tire rubber and within the tire air chamber).

The RFID sensor device can be conveniently applied/patched to a tire after tire vulcanization/curing (i.e., during a retrofitting procedure) by means of appropriate adhesives, or by implementing similar adequate processes (e.g., surface buffing procedure). Otherwise, the RFID sensor device can be conveniently integrated/embedded, partially or completely, into/in a tire before tire vulcanization/curing.

The RFID chip and the one or more external sensors (i.e., the pressure sensor and, if present, one or more additional sensors) can be conveniently arranged on a rigid or flexible board, thereby forming an electronic module, which can be conveniently located at:
  the center of the top conductive patch(es), thereby resulting in a symmetric and weight-balanced configuration; or
  an edge of the top conductive patch(es), thereby improving overall flexibility and conformability.

Conveniently, the RFID chip (which, in use, acts as a feeding point for the patch-type antenna) can be electrically connected to the top conductive patch(es) via tapered microstrip lines and/or direct soldering, and/or can be inductively coupled to said top conductive patch(es).

The RFID sensor device can be conveniently read by an RFID reader's antenna integrated into a rim, or mounted on a wheel arch, of a wheel comprising the tire into which said RFID sensor device is integrated, wherein said rim/wheel arch can be conveniently modified (e.g., by introducing one or more slots) so as to operate as an RFID interrogating antenna fed by a coaxial cable.

For a better understanding of the present invention, FIG. 1 schematically illustrates a first RFID sensor device (denoted as a whole by 1) according to a first preferred embodiment of the present invention.

In particular, said first RFID sensor device 1 comprises:
a bottom ground plane 10;
an intermediate dielectric substrate 11 arranged on the bottom ground plane 10;
a first top conductive patch 12 and a second top conductive patch 13 (e.g., a first top metal patch 12 and a second top metal patch 13) that are
  arranged on the intermediate dielectric substrate 11 so as to leave a top elongated and median area 11a of said intermediate dielectric substrate 11 exposed, which acts as radiating slot 11a of the patch-type antenna, and
  short-circuited to the bottom ground plane 10 by means of two shorting metal stripes 14 that are arranged at two opposite corners of the multilayer structure formed by the bottom ground plane 10, the intermediate dielectric substrate 11 and said first and second top conductive patches 12, 13, and that vertically extend between the bottom ground plane 10 and, respectively, the first/second top conductive patch 12/13 (in this connection, it is worth noting that, alternatively, said first and second top conductive patches 12, 13 could be capacitively coupled with the bottom ground plane 10, without any metal stripes 14);
a printed circuit board (PCB) 15 that is
  arranged partially on the first top conductive patch 12, partially on the radiating slot 11a and partially on the second top conductive patch 13, and centrally with respect to said radiating slot 11a,
  electrically connected to said first and second top conductive patches 12, 13 through vias 18, and
  conveniently made on a rigid substrate (e.g., based on FR4), or a flexible substrate (e.g., based on Kapton, Duroid or polyethylene terephthalate (PET));
an RFID chip 16 that is installed on the PCB 15 and is connected/coupled to both the first and second top conductive patches 12, 13, wherein a temperature sensor (not shown in FIG. 1) is integrated into said RFID chip 16 (conveniently, said integrated temperature sensor having programmable dynamic range and amplifier gain); and
a pressure sensor 17 installed on the PCB 15 and connected to the RFID chip 16.

Conveniently, the PCB 15 may include a plurality of pads (not shown in FIG. 1) for connecting the pressure sensor 17 as well as additional sensors (e.g., a deformation sensor, a strain sensor, an acceleration sensor, a stress sensor, an additional temperature sensor—such as an external temperature probe of the Pt1000 or negative temperature coefficient (NTC) type—etc.).

Figure 2:
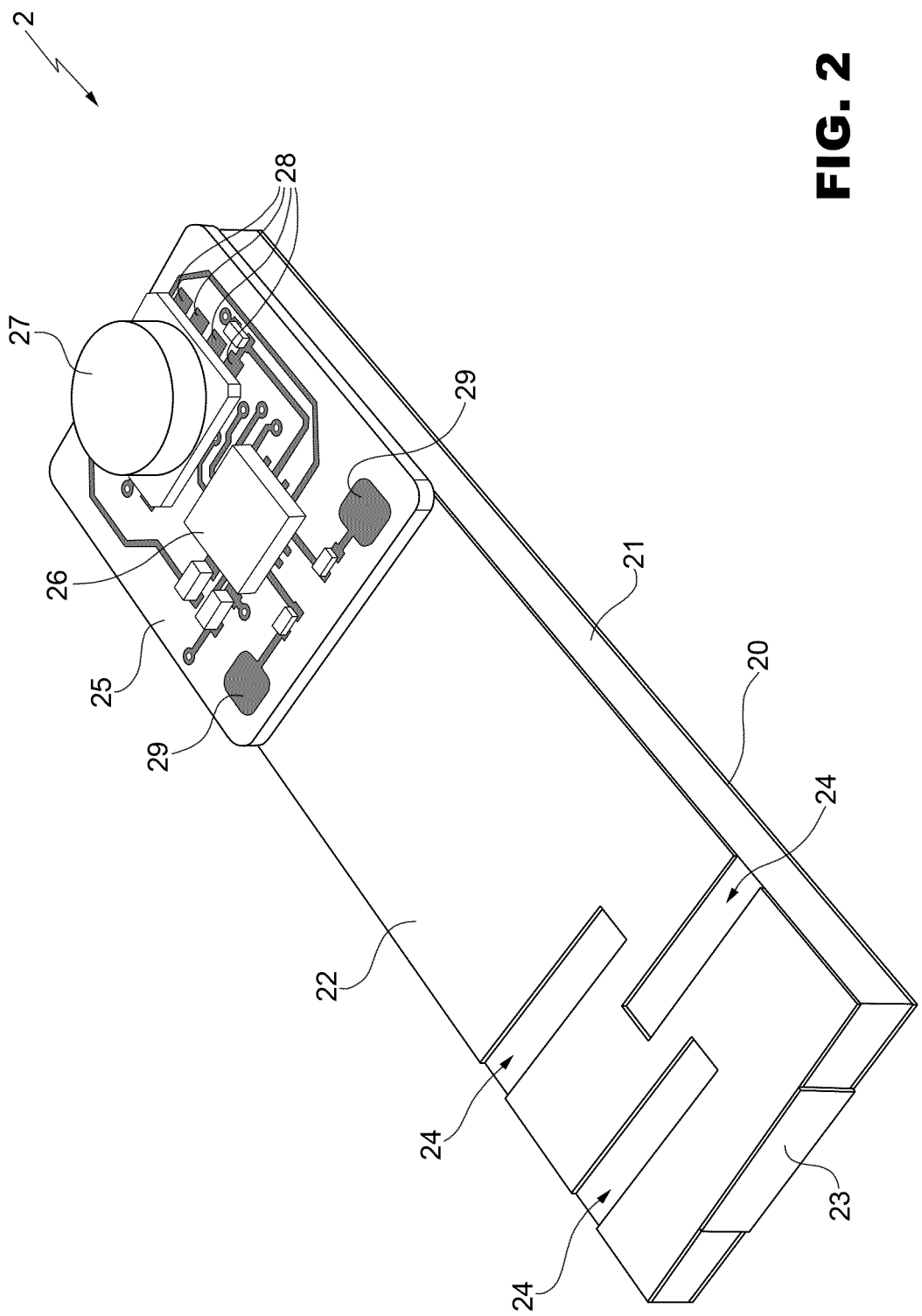
FIGS. 2 and 3 schematically illustrate a second RFID sensor device according to a second preferred embodiment of the present invention.
Figure 3:
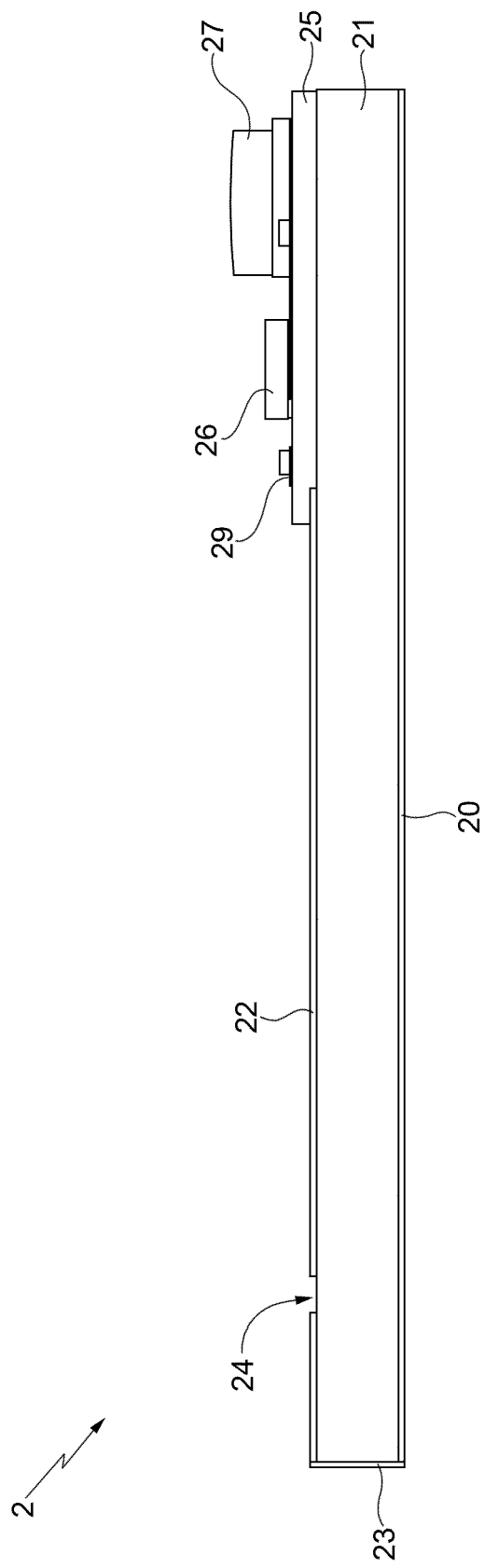

FIGS. 2 and 3 schematically illustrate a second RFID sensor device (denoted as a whole by 2) according to a second preferred embodiment of the present invention. In particular, FIG. 2 is a perspective view of the second RFID sensor device 2, whereas FIG. 3 is a side view thereof.

Said second RFID sensor device 2 comprises:
a bottom ground plane 20, which may conveniently be a continuous or gridded/meshed metal layer;
an intermediate dielectric substrate 21 (conveniently, a conformal dielectric substrate) arranged on the bottom ground plane 20;
a top metal layer 22 arranged on the intermediate dielectric substrate 21 and acting as a single top conductive patch;
a shorting metal wall 23 (whose length can be conveniently sized for tuning the operating frequency of the second RFID sensor device 2) vertically extending on a side of the intermediate dielectric substrate 21 between the bottom ground plane 20 and the top metal layer 22, thereby short-circuiting said bottom ground plane 20 and said top metal layer 22;
three tuning notches 24 made on the top metal layer 22, thereby exposing three corresponding portions of the intermediate dielectric substrate 21 beneath, introduced to achieve miniaturization of the second RFID sensor device 2 and conveniently sized for tuning at operating frequency thereof;
a rigid or flexible board 25 (such as a PCB made on a rigid substrate (e.g., based on FR4) or a flexible substrate (e.g., based on Kapton, Duroid or PET)) arranged partially on the top metal layer 22 and partially on the intermediate dielectric substrate 21, for housing electronic circuitry;
an RFID chip 26 installed on the rigid/flexible board 25, wherein a temperature sensor (not shown in FIGS. 2 and 3) is integrated into said RFID chip 26 (conveniently, said integrated temperature sensor having programmable dynamic range and amplifier gain);
a pressure sensor 27 installed on the rigid/flexible board 25 and connected to the RFID chip 26 through pads 28 of said rigid/flexible board 25; and
additional pads 29 of said rigid/flexible board 25 for connecting additional sensors (e.g., a deformation sensor, a strain sensor, an acceleration sensor, a stress sensor, an additional temperature sensor—such as an external temperature probe of the Pt1000 or NTC type—etc.) and/or a battery.

Figure 4:
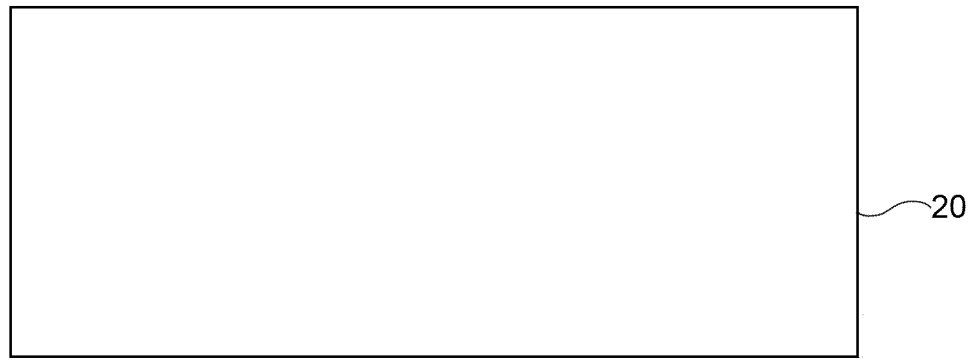
FIGS. 4 and 5 are bottom views of the second RFID sensor device according to two alternative embodiments thereof.
Figure 5:
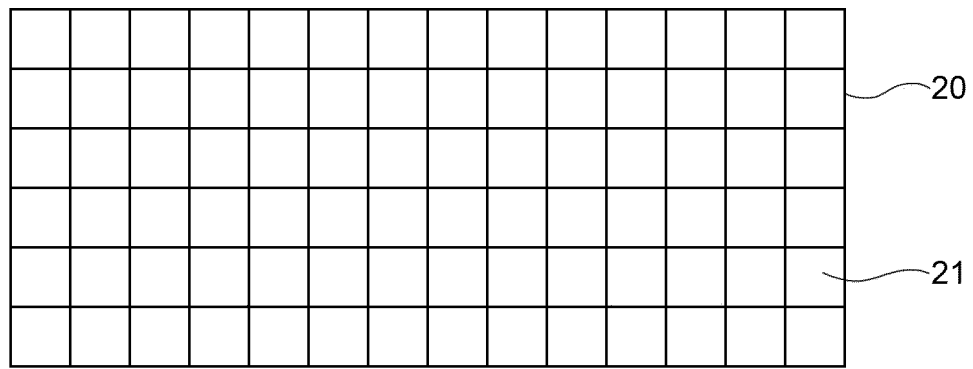

FIGS. 4 and 5 are bottom views of the second RFID sensor device 2, wherein in FIG. 4 the bottom ground plane 20 is made up of a continuous metal layer, whereas in FIG. 5 the bottom ground plane 20 is made up of a gridded/meshed metal layer.

Figure 6:
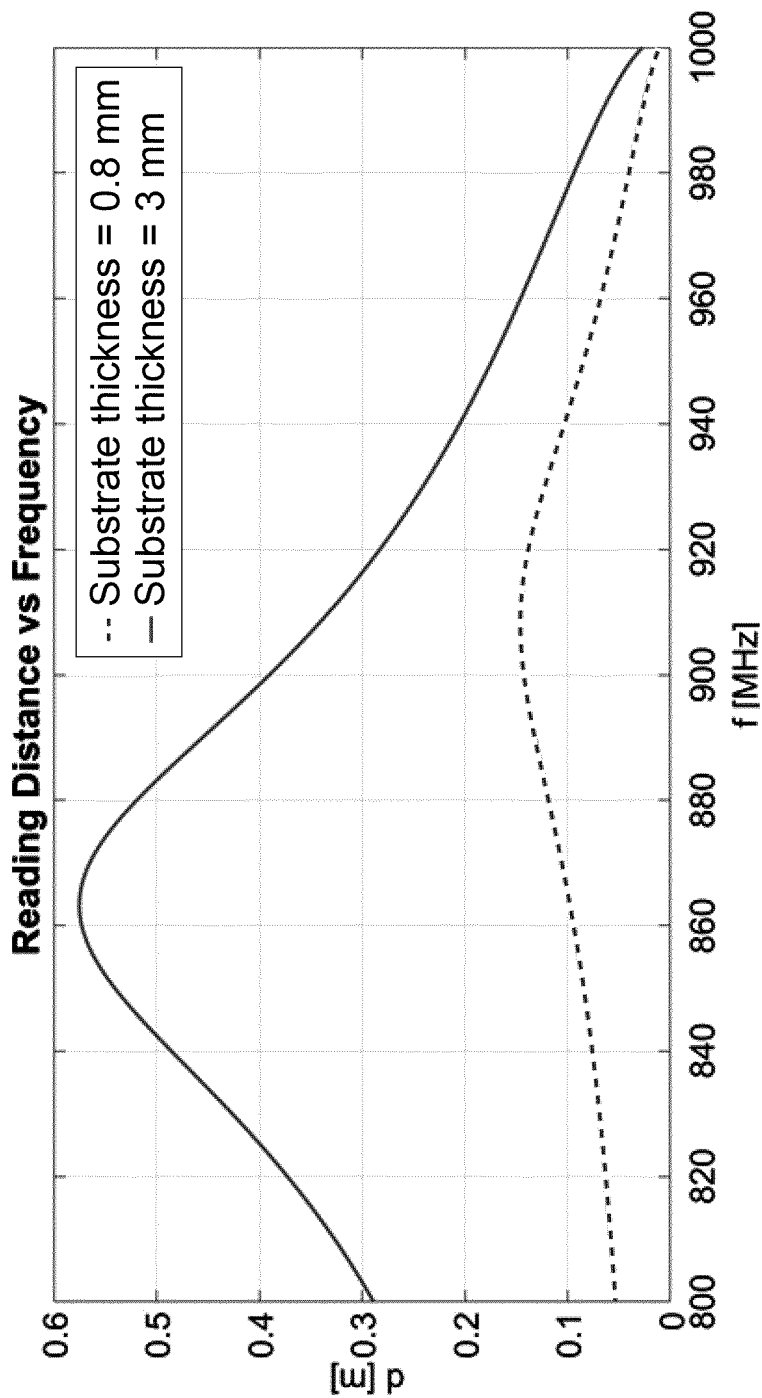
FIG. 6 shows simulated results related to reading distance with respect to operating frequency of an RFID sensor device according to an embodiment of the present invention.

FIG. 6 shows simulated results related to reading distance d with respect to operating frequency f of an RFID sensor device according to an embodiment of the present invention (such as the first RFID sensor device 1 shown in FIG. 1) wherein the intermediate dielectric substrate (sandwiched between the bottom ground plane and the top conductive patch(es)) is made by using a portion of tire rubber (e.g., a rubber having a dielectric constant (i.e., relative permittivity) $\varepsilon_r$ between 3 and 9, and an electrical conductivity $\sigma$ smaller than 0.05 S/m). In this case, even very thin configurations (i.e., with intermediate dielectric substrate thickness of only 0.8 mm) can be read in close vicinity, while if the intermediate dielectric substrate is thicker (i.e., 3 mm) and the antenna is properly tuned, reading distances of more than 50 cm can be achieved.

In the first and second RFID sensor devices 1, 2, the RFID chips 16, 26 are configured to control one or more analogue and/or digital external sensors (e.g., as previously described, the pressure sensors 17, 27 and, conveniently, also a deformation sensor and/or a strain sensor and/or an acceleration sensor and/or an external temperature probe, etc.). Moreover, conveniently, one or more additional sensors might be directly integrated into the RFID chips 16, 26 (e.g., an acceleration sensor and/or a strain sensor with programmable dynamic range and amplifier gain).

Preferably, the RFID chips 16, 26 are configured to perform a self-tuning of their input impedance and/or of the input impedance of their respective patch-type antenna so as to compensate for varying surrounding dielectric/electromagnetic conditions. In this way, the first and second RFID sensor devices 1, 2 are able to adapt themselves to the surrounding dielectric/electromagnetic conditions (for example, they are able to adapt themselves to the specific tires, and/or to the positions, which they are applied into/to/at), thereby maximizing their RFID communication performance (e.g., in terms of reading distance).

Conveniently, the RFID chips 16, 26 can include also an integrated RSSI-on-chip sensor and/or an integrated matching sensor.

Additionally, the RFID chips 16, 26 can be advantageously used in:
 a fully passive mode (i.e., the energy required for activation and replies is entirely scavenged from the electromagnetic waves emitted by an interrogating RFID reader); or
 a battery-assisted mode (i.e., a local battery supplying additional energy is provided for increased reading distances and, above all, to perform periodic measurements even in the absence of an interrogating RFID reader (e.g., for data logging)).

As previously described, the RFID chips 16, 26, the pressure sensors 17, 27 and, if present, one or more additional external sensors can be conveniently arranged on a PCB made on a rigid substrate (e.g., based on FR4) or a flexible substrate (e.g., based on Kapton, Duroid or PET), wherein interconnection traces can be conveniently manufactured by etching the PCB.

The first and second RFID sensor devices 1, 2 can be conveniently embedded in tires before or after tire vulcanization/curing. In particular, the first and second RFID sensor devices 1, 2 can be conveniently embedded in tires after tire vulcanization/curing by being patched onto tire inner liner (IL). More in detail, in order to be patched onto tire IL after tire vulcanization/curing process, appropriate procedures (e.g., surface buffing procedure) and/or appropriate adhesives can be conveniently used to attach the first and second RFID sensor devices 1, 2 to tire surface.

Conveniently, the first or second RFID sensor device 1/2 is arranged in a tire so that the pressure sensor 17/27 face towards tire's internal surface and is in contact with air within the tire air chamber, while the rest of the first/second RFID sensor device 1/2 can be partially integrated within the tire itself. In this case, the pressure sensor 17/27 is conveniently designed or protected to withstand vulcanization/curing (e.g., by using a temporary protecting thermal insulating cap).

Conveniently, as for temperature monitoring, it is possible to:
 monitor the temperature inside the rubber of the tire by means of the temperature sensor integrated into the RFID chip 16/26, with the first/second RFID sensor device 1/2 partially integrated within the tire; and/or
 monitor the temperature in both internal and external areas of tire surface by means of additional temperature sensors connected to the RFID chip 16/26.

In both cases previously described regarding pressure and temperature monitoring, in order to guarantee that the first/second RFID sensor device 1/2 can be embedded within the tire preserving proper operation of the pressure sensor 17/27, it is conveniently possible to:
 exploit structural elements of the tire (for example, electrically conductive components inherently present inside the tire itself, such as tread plies) to make the bottom ground plane 10/20 of the patch-type antenna; or
 make the ground plane 10/20 by means of electrically conductive textile/fabric/thread/fiber/yarn elements or a metal weft/net/mesh, whose spacing is properly sized so as to electromagnetically result as an equivalent continuous electrically-conductive plane at the operating frequency/ies of the first/second RFID sensor device 1/2—namely, the biggest size D of the holes of the metal weft/net/mesh is much smaller than the effective wavelength.

In mathematical terms, it results that:

$$D<<\lambda_{\mathit{eff}}/10,$$

with $$\lambda_{\mathit{eff}}=\lambda_0/\sqrt{\varepsilon_{eq}}$$

where
 $\lambda_0=c/f$, where c denotes the speed of light and f is the operating frequency of the first/second RFID sensor device 1/2, and
 $\varepsilon_{eq}$ denotes the effective permittivity calculated as the volume-weighted average of the permittivity of the layers constituting the intermediate dielectric substrate 11/21 and of the surrounding air.

The resulting structure is, thence, electromagnetically equivalent to a continuous electrically-conductive plane while maintaining a porous configuration with holes, that is mechanically consistent and let the natural rubber of the tire permeate through said holes and seal with the rubber used as intermediate dielectric substrate 11/21, thereby achieving a perfect integration of the first/second RFID sensor device 1/2 into the tire.

Figure 7:
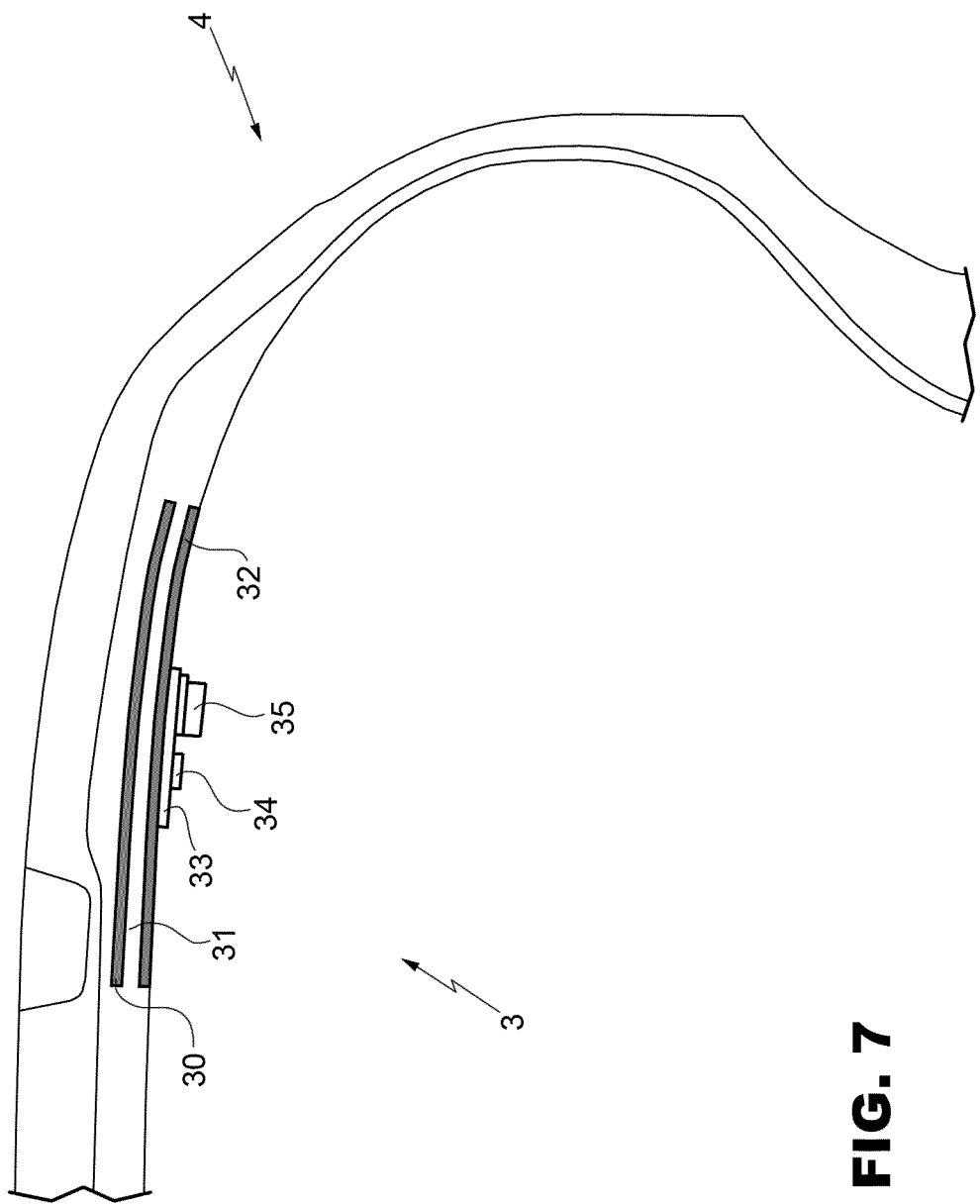
FIG. 7 schematically illustrates an example of integration into a tire of a third RFID sensor device according to a third preferred embodiment of the present invention.

In this respect, FIG. 7 shows an example of integration of a third RFID sensor device (denoted as a whole by 3) according to a third preferred embodiment of the present invention into a tire 4.

In particular, said third RFID sensor device 3 includes:
 a bottom ground plane 30 made by exploiting structural conductive elements of the tire 4 (e.g., tread plies);
 an intermediate dielectric substrate 31 arranged on the bottom ground plane 30 and made by exploiting inner liner made of rubber of the tire 4 and body plies made of textile;
 a top metal layer or patch 32 arranged on the intermediate dielectric substrate 31 and exposed on an inner surface of the tire 4 so as to face towards an air chamber of said tire 4;
 a rigid or flexible board 33 arranged on the top metal layer/patch 32;
 an RFID chip 34 installed on the rigid/flexible board 33, wherein a temperature sensor (not shown in FIG. 7) is integrated into said RFID chip 34; and
 a pressure sensor 35 installed on the rigid/flexible board 33, connected to the RFID chip 34, and facing towards the air chamber of the tire 4 so as to be able to monitor inflation pressure of said tire 4.

Hereinafter a few illustrative (but non-limitative) examples of use of the present invention will be described in detail.

Firstly, the present invention can be advantageously used during production and testing of tires.

In fact, the quality and the mechanical/chemical performance of tires are related to the quality of their production process (vulcanization thermal cycles, integration of different materials) and then to the quality tests performed. In particular, vulcanization is an extremely sensitive process, only taking place between 100 and 200° C.

Production process optimization and product quality certainty need, hence, a temperature monitoring inside the elastomeric blend making up the tire during both vulcanization and subsequent testing.

The use of traditional wired sensors (e.g., thermocouples/thermoresistances) is expensive and difficult due to the need to embed cables in rotating structures.

On the contrary, the RFID sensor device according to the present invention can be advantageously used to perform thermal/pressure monitoring during the vulcanization phase. Moreover, it can provide sensing data in real time for multiple sample points in a tire during durability/speed/fatigue drum tests as well as for the entire life cycle.

Thanks to the absence of cables and batteries, the RFID sensor device according to the present invention can be integrated very easily with the set-up of the durability drum tests and does not require any modification to the just manufactured tire.

Moreover, the present invention allows reducing costs for the instrumentation and the time needed to run the tests.

In a further application scenario, the RFID sensor device according to the present invention can be also used, in presence of legacy wired sensors, as a time and cost efficient countercheck of the proper functioning of the pressure sensors formerly used for tire parameter control during testing, thus enabling to rapidly identify possible malfunctioning of the sensors before the tests are run.

Figure 8:
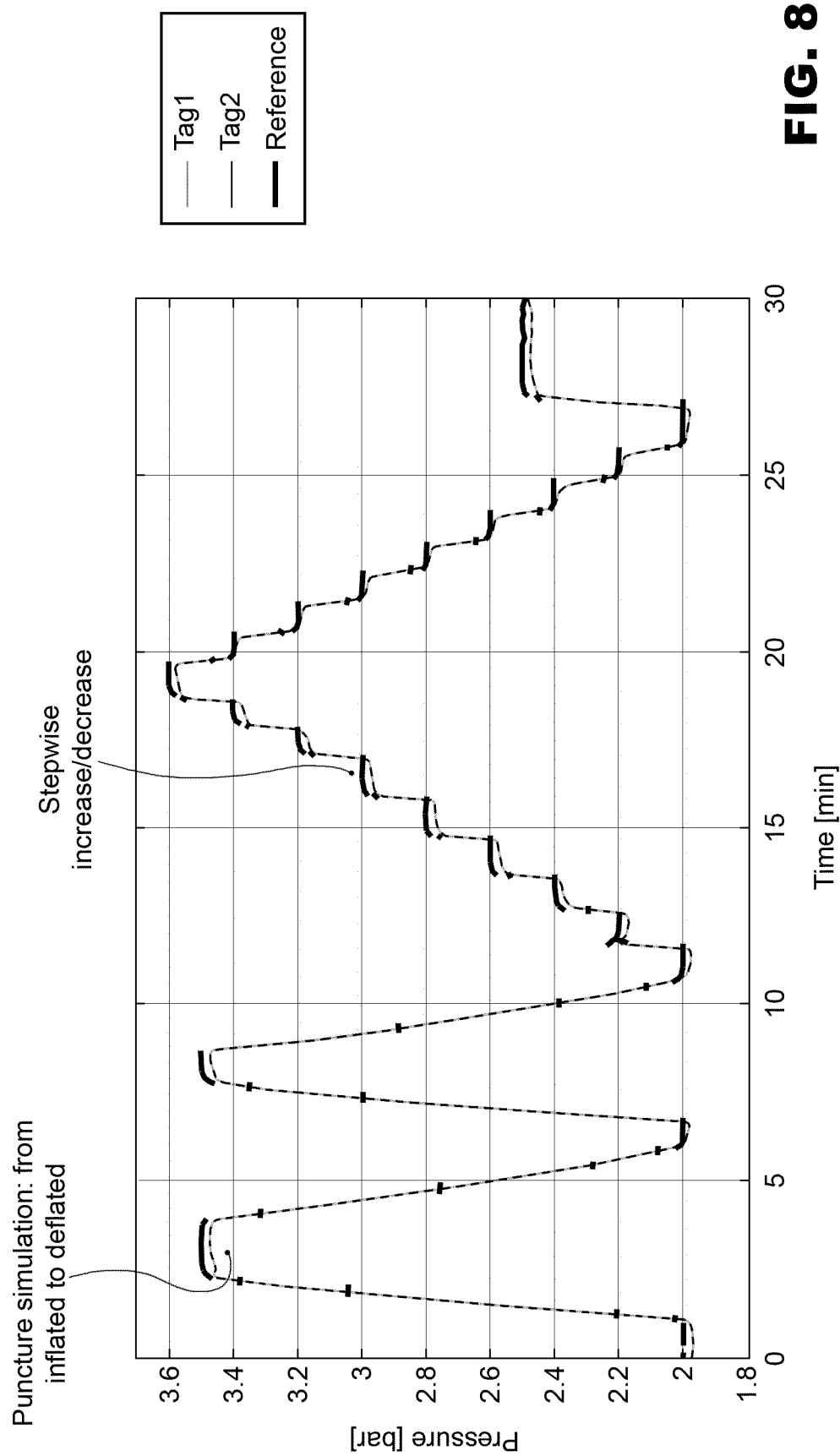
FIG. 8 shows real-time pressure measurements for a tire rolling on a drum machine during an inflating/deflating session with comparison of pressure measurements from two RFID sensor devices according to the present invention and from a reference wired pressure gauge.

FIG. 8, for instance, shows an example of real-time pressure monitoring during a test of a tire rolling at 60 km/h on a drum machine. More specifically, in the example shown in FIG. 8, a tire was equipped with two RFID sensor devices according to the present invention (denoted as Tag1 and Tag2) patched onto the inner liner (in particular, a first RFID sensor device located in proximity of the valve, and a second RFID sensor device radially arranged at 180° from the valve). During rolling, the tire was inflated and suddenly deflated, in order to simulate a rapid deflation thereof (for example due to a puncture). Moreover, a controlled stepwise increase/decrease in pressure was simulated with a good match with respect to a reference sensor (average offset with respect to the reference inflator on the valve is less than 0.03 bar). Abrupt differences in the similarity between pressure measurements obtained with the RFID sensor devices according to the present invention and the reference sensor could pinpoint a malfunctioning of one of the sensors.

Another advantageous application for the present invention is real-time monitoring of tires (for example, mounted on passenger or off-road vehicles, or on aircraft, or on buses/trucks) when the vehicles/aircraft/buses/trucks passes through active gates equipped with long-range RFID readers. In particular, at a gate (e.g., at departure and/or arrival in an airport, or in warehouses, or at checkpoints for tire diagnosis, etc.), the RFID reader univocally detects the RFID sensor devices embedded in tires, reads the information items (identifiers and sensed data) measured in real time, and/or downloads the time history stored in their memory (e.g., in case of RFID sensor devices set in data logger mode). The read information items provide information about the current condition of the tires as well as their history (temperatures, pressures, etc.). Data can be directly processed and transmitted to a cloud computing system for analysis.

By using the present invention, substantial improvements with respect to the current TPMSs is achieved thanks to easier installation, interrogation and data analysis.

Moreover, by installing RFID readers directly on board vehicles/aircraft it is possible to monitor in real time the condition of tires.

Additionally, a specific advantageous application for the present invention is the monitoring of high-performance racing tires. In this case, an RFID reader can be conveniently mounted at a pit to monitor physical parameters of the tires both before the start and after the end of a race. Moreover, a status update can be provided during each pit stop, thus helping in early identification of malfunctioning.

Another advantageous application for the present invention is at airports. In this case, an RFID reader can be conveniently mounted at specific gates and/or used by ground personnel. For example, at arrival of an aircraft, the RFID reader can read information about temperatures and pressures of the tires, providing precious health information after the critical landing phase. Moreover, in this way it is also possible to assess whether the aircraft has been too long stationary, with loss in pressure/temperature conditions of the tires.

Moreover, an RFID reader could be conveniently installed also on board aircraft to monitor in real time temperature and pressure of the tires (e.g., in the critical landing and braking phases).

A further advantageous application for the present invention is the monitoring of the temperature of tread plies (in particular, of off-road tires) in operating condition. In fact, the RFID sensor device according to the present invention can be conveniently used to monitor the temperature of specific tire elements, such as tread plies, in operating conditions (i.e., during use).

In this case, an RFID reader can be conveniently installed directly on board a vehicle. In particular, the RFID reader can be conveniently mounted on the vehicle, with its antenna facing towards the tire. Preferably, the antenna of the RFID reader can be arranged/mounted/integrated on/into the tire rim or the wheel arch. For example, the rim/wheel arch could conveniently include slots designed to act as electromagnetic radiating elements for reading the RFID sensor device embedded in the tire.

This application is particularly beneficial for off-road tires that are typically subject to strong stress during use. In particular, the tread is the most critical area to monitor, since it faces the road and, hence, is subject to the most intense fatigue.

The RFID sensor device according to the present invention has an architecture particularly advantageous for its direct integration in the tread. In fact, the use of a patch-type antenna allows minimizing the detrimental effect of the metallic parts of the tread on the electromagnetic performance. Indeed, such metallic plies, as well as an ad hoc metallic yarn net, can be advantageously used to effectively make the bottom ground plane of the patch-type antenna.

Figure 9:
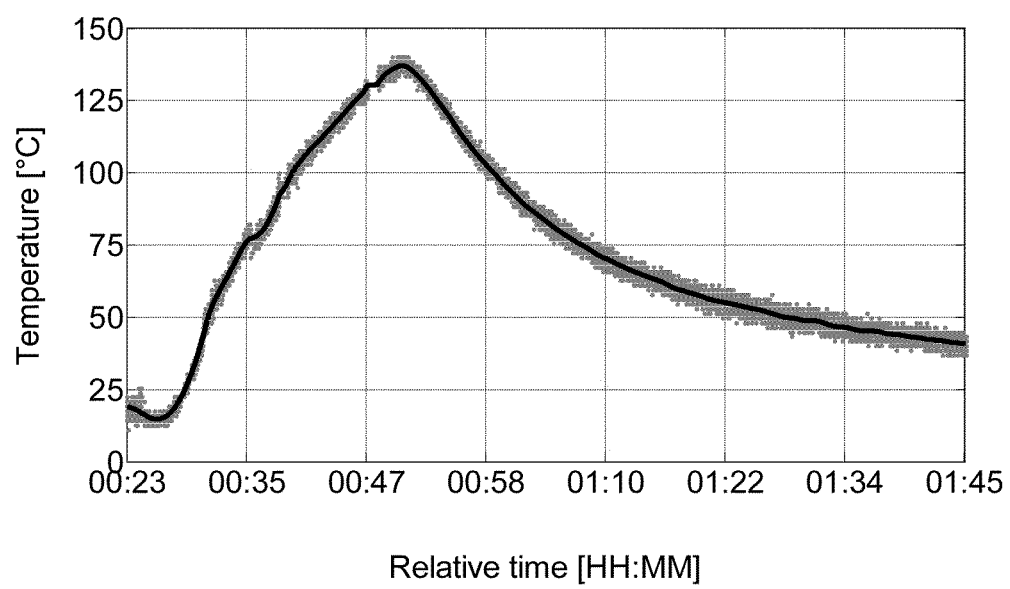
FIG. 9 shows temperature values of tread plies of an off-road tire measured by an RFID sensor device according to the present invention.

In this respect, FIG. 9 shows temperature values of tread plies of an off-road tire measured by an RFID sensor device according to the present invention, along with reference temperature data. As shown, the present invention provides excellent temperature monitoring, closely matching the reference temperature data. In particular, the temperature values shown in FIG. 9 were measured by an RFID sensor device equipped with an external temperature probe, whose use is preferable when it is necessary to perform temperature monitoring at parts of a tire that are less accessible, or where it is virtually impossible to integrate/apply the whole RFID sensor device.

From the foregoing, the technical advantages and the innovative features of the present invention are immediately evident to those skilled in the art.

In conclusion, it is clear that numerous modifications and variants can be made to the present invention, all falling within the scope of the invention, as defined in the appended claims.

The invention claimed is:

1. A radio frequency identification (RFID) sensor device configured to be embedded in, integrated into, or applied to a tire, the device comprising a patch-type antenna that includes a multilayer structure, the multilayer structure comprising:
   a bottom ground plane;
   an intermediate dielectric substrate arranged on the bottom ground plane;
   one or more top conductive patches arranged on the intermediate dielectric substrate and covering partially or completely the intermediate dielectric substrate, wherein the bottom ground plane and the one or more top conductive patches are short-circuited or capacitively coupled;
   a rigid or flexible board arranged on the one or more top conductive patches and/or the intermediate dielectric substrate;
   an RFID chip installed on the rigid or flexible board and coupled to the one or more top conductive patches;
   a temperature sensor integrated into, or connected to, the RFID chip; and
   a pressure sensor installed on the rigid or flexible board and connected to the RFID chip;
   wherein the bottom ground plane is formed by:
      conductive textile/fabric/thread/fiber/yarn elements and/or layers, or by a metal weft/net/mesh; or
      at least partially by conductive and/or metal elements and/or layers of the tire;
   wherein the intermediate dielectric substrate is made at least partially of rubber, or is formed at least partially by dielectric and/or rubber elements and/or layers of the tire.

2. The RFID sensor device of claim 1, further comprising one or more additional sensors connected to the RFID chip via the rigid or flexible board.

3. The RFID sensor device of claim 2, wherein the pressure sensor is connected to the RFID chip via one or more first pads of the rigid or flexible board, and wherein the one or more additional sensors are connected to the RFID chip via one or more second pads of the rigid or flexible board.

4. The RFID sensor device of claim 2, wherein the one or more additional sensors include an additional temperature sensor.

5. The RFID sensor device of claim 2, wherein the one or more additional sensors include one or more of the following sensors: a deformation sensor, a strain sensor, an acceleration sensor, a stress sensor, an additional temperature sensor.

6. The RFID sensor device of claim 1, further comprising a battery connected to the RFID chip.

7. The RFID sensor device of claim 1, wherein the intermediate dielectric substrate includes one or more flexible and/or rigid layers.

8. The RFID sensor device of claim 1, wherein one or more tuning notches are provided on the one or more top conductive patches, thereby exposing one or more corresponding portions of the intermediate dielectric substrate beneath.

9. The RFID sensor device of claim 1, wherein the rigid or flexible board is a printed circuit board (PCB) provided on a rigid or flexible substrate.

10. The RFID sensor device of claim 9, wherein the PCB is provided on a rigid substrate made, at least partially, of FR4.

11. The RFID sensor device of claim 9, wherein the PCB is provided on a flexible substrate made, at least partially, of Kapton, Duroid or polyethylene terephthalate.

12. The RFID sensor device of claim 1, further comprising a shorting metal wall vertically extending on a side of the intermediate dielectric substrate between the bottom ground plane and the one or more top conductive patches, thereby short-circuiting the bottom ground plane and the one or more top conductive patches.

13. A tire comprising a radio frequency identification (RFID) sensor device, the device comprising a patch-type antenna that includes a multilayer structure, the multilayer structure comprising:
   a bottom ground plane;
   an intermediate dielectric substrate arranged on the bottom ground plane;
   one or more top conductive patches arranged on the intermediate dielectric substrate and covering partially or completely the intermediate dielectric substrate, wherein the bottom ground plane and the one or more top conductive patches are short-circuited or capacitively coupled;
   a rigid or flexible board arranged on the one or more top conductive patches and/or the intermediate dielectric substrate;
   an RFID chip installed on the rigid or flexible board and coupled to the one or more top conductive patches;
   a temperature sensor integrated into, or connected to, the RFID chip; and
   a pressure sensor installed on the rigid or flexible board and connected to the RFID chip;
   wherein the bottom ground plane is formed by:
      conductive textile/fabric/thread/fiber/yarn elements and/or layers, or by a metal weft/net/mesh; or
      at least partially by conductive and/or metal elements and/or layers of the tire;
   wherein the intermediate dielectric substrate is made at least partially of rubber, or is formed at least partially by dielectric and/or rubber elements and/or layers of the tire.

14. The tire of claim 13, wherein the RFID sensor device is partially integrated into the tire so that the pressure sensor faces towards an air chamber of the tire.

15. The tire of claim 13, wherein the RFID sensor device is embedded in, or partially integrated in, or applied to the tire so that the temperature sensor measures rubber temperature of the tire.

16. The tire of claim 15, wherein the RFID sensor device includes an additional temperature sensor connected to the RFID chip and configured to perform temperature measurements on an internal or external surface of the tire.

17. A vehicle comprising at least one tire comprising a radio frequency identification (RFID) sensor device, the device comprising a patch-type antenna that includes a multilayer structure, the multilayer structure comprising:
- a bottom ground plane;
- an intermediate dielectric substrate arranged on the bottom ground plane;
- one or more top conductive patches arranged on the intermediate dielectric substrate and covering partially or completely the intermediate dielectric substrate, wherein the bottom ground plane and the one or more top conductive patches are short-circuited or capacitively coupled;
- a rigid or flexible board arranged on the one or more top conductive patches and/or the intermediate dielectric substrate;
- an RFID chip installed on the rigid or flexible board and coupled to the one or more top conductive patches;
- a temperature sensor integrated into, or connected to, the RFID chip; and
- a pressure sensor installed on the rigid or flexible board and connected to the RFID chip;

wherein the bottom ground plane is formed by:
- conductive textile/fabric/thread/fiber/yarn elements and/or layers, or by a metal weft/net/mesh; or
- at least partially by conductive and/or metal elements and/or layers of the tire;

wherein the intermediate dielectric substrate is made at least partially of rubber, or is formed at least partially by dielectric and/or rubber elements and/or layers of the tire.

18. The vehicle of claim 17, further comprising an RFID reader connected to one or more interrogating antennas configured to read, from the RFID sensor device, temperature and pressure values measured by, respectively, the temperature sensor and the pressure sensor.

19. The vehicle of claim 17, wherein the RFID reader is installed onboard the vehicle, and wherein the one or more interrogating antennas are integrated into and/or mounted on a rim or a wheel arch of a wheel comprising the tire.

20. The vehicle of claim 17, wherein the vehicle is a passenger or off-road or racing vehicle, or an aircraft, or a truck, or a bus.

* * * * *